US012776935B2

(12) United States Patent
Silverman et al.

(10) Patent No.: US 12,776,935 B2
(45) Date of Patent: Oct. 27, 2026

(54) ACCESS POINT WITH GUARD INTERVAL PROCESS

(71) Applicant: Cisco Technology, Inc., San Jose, CA (US)

(72) Inventors: Matthew A. Silverman, Shaker Heights, OH (US); Robert E. Barton, Richmond (CA); Ardalan Alizadeh, Campbell, CA (US); Peiman Amini, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 18/541,951

(22) Filed: Dec. 15, 2023

(65) Prior Publication Data

US 2025/0202747 A1 Jun. 19, 2025

(51) Int. Cl.

*H04L 27/26* (2006.01)
*G01S 7/00* (2006.01)
*G01S 13/10* (2006.01)
*H04B 7/0413* (2017.01)

(52) U.S. Cl.

CPC .......... *H04L 27/2605* (2013.01); *G01S 7/006* (2013.01); *G01S 13/10* (2013.01); *H04B 7/0413* (2013.01)

(58) Field of Classification Search

CPC ... H04L 27/26; H04L 27/2605; H04B 7/0413; G01S 13/10; G01S 7/00; G01S 7/006

See application file for complete search history.

(56) References Cited

U.S. PATENT DOCUMENTS

| | | | | |
|---|---|---|---|---|
| 9,357,556 | B2 * | 5/2016 | Gan | H04W 24/02 |
| 9,696,421 | B2 * | 7/2017 | DiStasio | G01S 13/888 |
| 10,670,692 | B1 | 6/2020 | Marko | |
| 11,601,317 | B2 | 3/2023 | Barton et al. | |
| 2022/0141076 | A1 | 5/2022 | Hammerschmidt et al. | |
| 2023/0065940 | A1 | 3/2023 | Zhang et al. | |

FOREIGN PATENT DOCUMENTS

WO 2016011433 A2 1/2016

OTHER PUBLICATIONS

"Guard Interval (802.11n/ac/ax/be)", Keysight.com, retrieved from URL: https://rfmw.em.keysight.com/wireless/helpfiles/89600b/webhelp/Subsystems/wlan-mimo/content/mimo_fmt_grdintparams.htm on Mar. 8, 2024, 2 Pages.

Porat R., et al., "Payload Symbol Size for 11ax", Doc.: IEEE 802.11-15/0099, Jan. 12, 2015, 33 Pages.

Zandian R., "Ultra-wideband Based Indoor Localization of Mobile Nodes in ToA and TDoA Configurations", University of Bielefeld, 2019, 250 Pages.

* cited by examiner

*Primary Examiner* — Tuan H Nguyen

(74) *Attorney, Agent, or Firm* — Patterson + Sheridan, LLP

(57) ABSTRACT

The present disclosure describes a technique for access points to set guard intervals. An apparatus includes a first radio, one or more memories, and one or more processors communicatively coupled to the one or more memories. The first radio receives a reflection comprising a signal reflected by a structure. A combination of the one or more processors determines, based on the reflection, a position of the structure, sets a first guard interval based on the position of the structure, and transmits a first message according to the first guard interval.

20 Claims, 7 Drawing Sheets

ACCESS POINT WITH GUARD INTERVAL PROCESS

TECHNICAL FIELD

Embodiments presented in this disclosure generally relate to wireless communication. More specifically, embodiments disclosed herein access points with a guard interval process.

BACKGROUND

Access points provide wireless network access to devices that connect to the access points. Physical structures (e.g., walls, doors, etc.) between the access points and the devices may interfere with or change the signals transmitted by the access points and devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
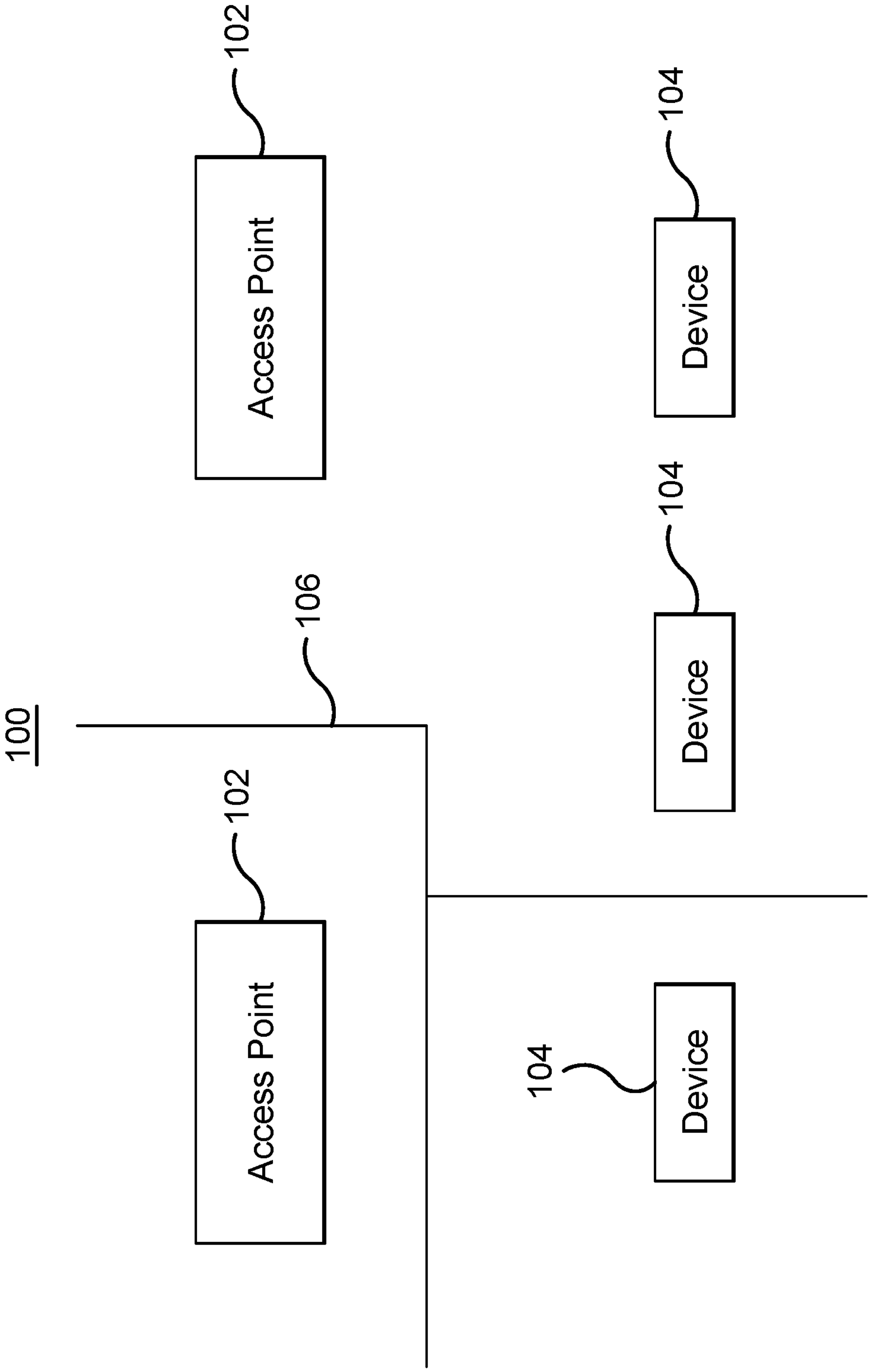
FIG. 1 illustrates an example system.

The present disclosure describes a technique for access points to set guard intervals. According to an embodiment, an apparatus includes a first radio, one or more memories, and one or more processors communicatively coupled to the one or more memories. The first radio receives a reflection comprising a signal reflected by a structure. A combination of the one or more processors determines, based on the reflection, a position of the structure, sets a first guard interval based on the position of the structure, and transmits a first message according to the first guard interval.

According to another embodiment, a method includes receiving, by a first radio, a reflection comprising a signal reflected by a structure, determining, based on the reflection, a position of the structure, setting a first guard interval based on the position of the structure, and transmitting a first message according to the first guard interval.

According to another embodiment, an apparatus includes a first radio, a second radio, and one or more processors. The first radio transmits an impulse. The second radio receives a reflection comprising the impulse reflected by a structure. A combination of the one or more processors determines, based on the reflection, a position of the structure, determines a first position of a first device, sets a first guard interval based on the position of the structure and the first position of the first device, and transmits a first message to the first device according to the first guard interval.

Example Embodiments

Access points provide wireless network access to devices that connect to the access points. Physical structures (e.g., walls, doors, etc.) between the access points and the devices may interfere with or change the signals transmitted by the access points and devices. One way to reduce this type of interference is for an access point to set a guard interval, which is a time period between distinct transmissions. By spacing out the distinct transmissions in time, the access point ensures that the transmissions do not interfere with one another (e.g., due to reflections from the environment). The guard interval, however, also reduces the data rate of the access point. Conventional systems lack a mechanism for dynamically setting a guard interval for different environments. As a result, conventional systems may set guard intervals that are unnecessarily high, which reduces data rates, or too low, which increases interference.

The present disclosure describes a process that an access point uses to set guard intervals. Generally, the technique uses the principles of radiolocation (e.g., radar) to determine the positions of structures (e.g., walls, doors, etc.) in the environment. For example, an access point may transmit a signal that is reflected back to the access point by structures in the environment. The access point determines, from the reflection, the positions of structures that reflected the signal. The access point then sets a guard interval to reduce interference caused by the structures. For example, the access point may determine, from the positions of the structures, the reflections and interference that the structures will cause. The access point may then set a guard interval that reduces this interference.

In certain embodiments, the access point provides several technical advantages. For example, the access point dynamically sets a guard interval depending on the positions of structures in the environment around the access point. As a result, the access point may adjust the guard interval automatically if the access point is moved to a different environment or if the environment around the access point changes. As another example, the access point may further reduce the interference caused by reflections relative to conventional systems that do not dynamically adjust the guard interval based on the environment. As a result, the access point may set the guard interval that minimizes interference while maximizing data rates in a particular environment.

FIG. 1 illustrates an example system 100. Generally, the system 100 may be a wireless network (e.g., a wireless fidelity (WiFi) network). As seen in FIG. 1, the system 100 includes one or more access points 102, one or more devices 104, and one or more structures 106. Generally, the devices 104 connect to the access points 102. The access points 102 provide network coverage for the system 100. The access points 102 communicate messages to the devices 104 and direct messages from the devices 104 towards their destinations.

An access point 102 facilitates wireless communication in the system 100. One or more devices 104 may connect to the access point 102. The access point 102 may then facilitate wireless communication for the connected devices 104. For example, the access point 102 may transmit messages to a connected device 104. As another example, the access point 102 may receive messages transmitted by the device 104. The access point 102 may then direct that message towards its intended destination.

A device 104 may be any suitable device that wirelessly connects to the access point 102. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user. The device 104 may include a hardware processor, memory, or circuitry configured to perform any of the functions or actions of the device 104 described herein. For example, a software application designed using software code may be stored in the memory and executed by the processor to perform the functions of the device 104.

The structures 106 may be surfaces or objects that interfere with signals transmitted by the access points 102 or the devices 104. For example, the structures 106 may be walls, doors, windows, furniture, etc. The structures 106 may reflect signals in the system 100, which may distort the signals and which may cause delays in the reception of the signals. For example, if an access point 102 transmits a message to a device 104, the device 104 may receive the message at a first time and then receive a reflected version of that message at a later time. The reflection may be received at the later time, because the reflection travels a further distance to reach the device 104 as a result of being reflected. The reflection may thus interfere with the reception of the message or subsequent messages. The positioning of the structures 106 relative to the access point 102 and the device 104 may affect how much interference is caused by reflections from the structures 106.

To protect against this type of interference, the access point 102 sets a guard interval, which is a period of time between distinct transmissions. For example, if the guard interval is 0.8 microseconds, then the access point 102 would wait 0.8 microseconds between distinct transmissions. Increasing the guard interval may further reduce interference but also data rates.

The access point 102 may determine the positioning of the structures 106 in the system 100 and set a guard interval based on the positioning of the structures 106. The access point 102 transmits a signal (e.g., an impulse) that is reflected by a structure 106 back to the access point 102. The access point 102 analyzes the reflected signal to determine a positioning of the structure 106 that reflected the signal. The access point 102 may then evaluate the positioning of the structure 106 and the positioning of a device 104 to determine an appropriate guard interval. For example, the access point 102 may set a guard interval in anticipation of the reflection that will be caused by the structure 106 as a result of the positioning of the structure 106 in the system 100. This guard interval may reduce the interference caused by the structure 106. The access point 102 may then transmit messages to the device 104 with the set guard interval.

Figure 2:
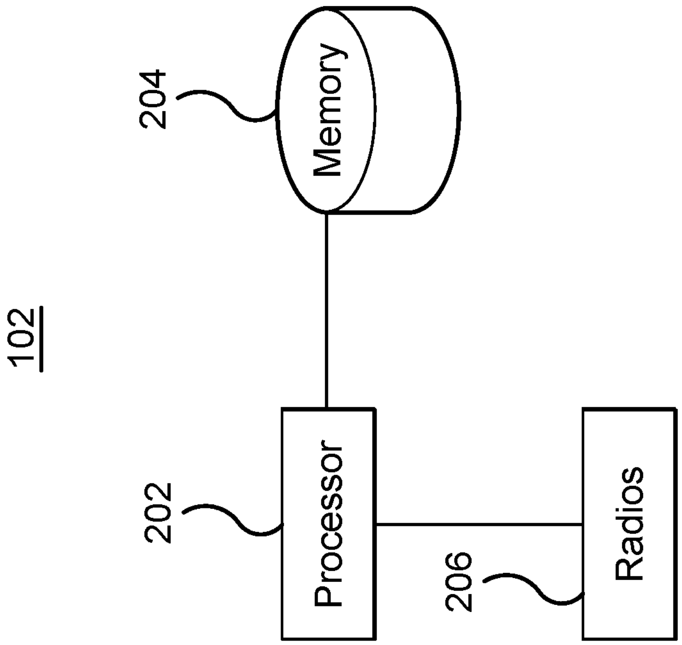
FIG. 2 illustrates an example access point in the system of FIG. 1.

FIG. 2 illustrates an example access point 102 in the system 100 of FIG. 1. As seen in FIG. 2, the access point 102 includes a processor 202, a memory 204, and one or more radios 206, which may perform the functions or actions of the access point 102 described herein.

The processor 202 is any electronic circuitry, including, but not limited to one or a combination of microprocessors, microcontrollers, application specific integrated circuits (ASIC), application specific instruction set processor (ASIP), and/or state machines, that communicatively couples to the memory 204 and controls the operation of the access point 102. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the access point 102 by processing information (e.g., information received from the devices 104, memory 204, and radios 206). The processor 202 is not limited to a single processing device and may encompass multiple processing devices contained in the same device or computer or distributed across multiple devices or computers. The processor 202 is considered to perform a set of functions or actions if the multiple processing devices collectively perform the set of functions or actions, even if different processing devices perform different functions or actions in the set.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular embodiments, the software may include an application executable by the processor 202 to perform one or more of the functions described herein. The memory 204 is not limited to a single memory and may encompass multiple memories contained in the same device or computer or distributed across multiple devices or computers. The memory 204 is considered to store a set of data, operational software, or information if the multiple memories collectively store the set of data, operational software, or information, even if different memories store different portions of the data, operational software, or information in the set.

The radios 206 may wirelessly communicate with devices 104 or other access points 102 in the system 100. The radios 206 may transmit and receive messages wirelessly from the devices 104 or access points 102. Some of the radios 206 may be arranged to transmit messages, while other radios 206 are arranged to receive messages. In some embodiments, the radios 206 include ultrawideband (UWB) radios that implement certain UWB features. For example, a radio 206 may transmit impulses that are reflected back to the access point 102 by a structure 106 in the environment. Another radio 206 may receive the reflected impulse. The access point 102 may analyze the reflected impulse to determine the positioning of the structure 106 in the environment.

Figure 3:
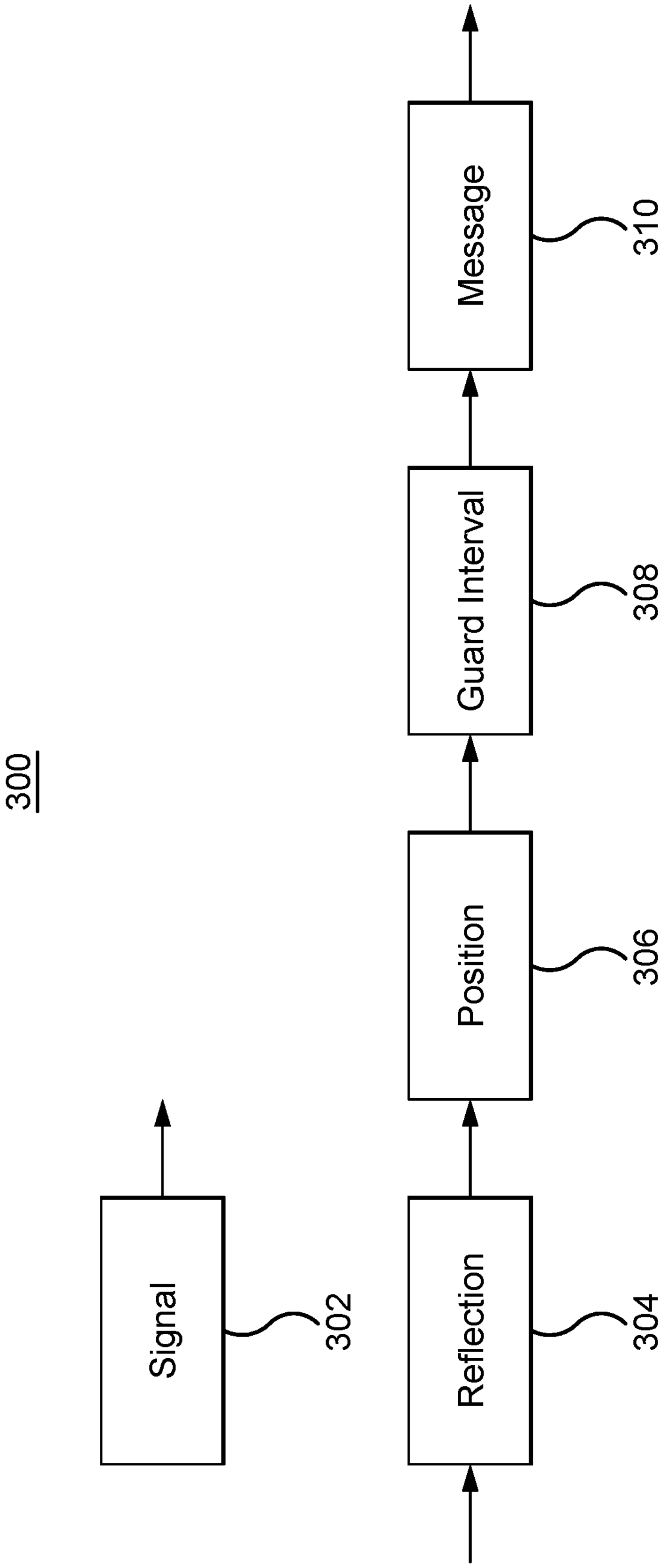
FIG. 3 illustrates an example operation for setting a guard interval performed by the system of FIG. 1.

FIG. 3 illustrates and example operation 300 for setting a guard interval performed by the system 100 of FIG. 1. The access point 102 may perform the operation 300. By performing the operation 300, the access point 102 determines the position of a structure and sets a guard interval based on the position of the structure. In this manner, the access point 102 sets a guard interval that mitigates or reduces interference resulting from propagation delays, echoes, or reflections caused by the positioning of the structure.

The access point 102 begins by transmitting a signal 302. The signal 302 may be an impulse that the access point 102 transmits in a particular direction. The signal 302 may travel through the system 100 and towards a structure 106. The structure 106 may reflect or redirect the impulse. The structure 106 may also alter or change the signal 302 when the structure 106 reflects or redirects the signal 302. For example, the structure 106 may introduce disturbances or other changes into the signal 302. The access point 102 receives a reflection 304. The reflection 304 may be a version of the signal 302 that was reflected or redirected by the structure 106. For example, the reflection 304 may include disturbances that were not present in the transmitted signal 302. As another example, the reflection 304 may include frequencies or amplitudes that are different from the transmitted signal 302. In some embodiments, the access point 102 uses different radios to transmit the signal 302 and to receive the reflection 304.

The access point 102 analyzes the reflection 304 to determine a position 306 of the structure 106 that reflected or redirected the signal 302. For example, the access point 102 may use the time difference between when the signal 302 was transmitted and when the reflection 304 was received to determine a distance between the access point 102 and the structure 106. The access point 102 may also use the direction in which the signal 302 was transmitted and the direction in which the reflection 304 was received to determine in which direction the structure 106 is positioned relative to the access point 102. As another example, the access point 102 may use the frequencies or amplitudes in the reflection of 304 to determine a characteristic of the structure 106 (e.g., a material of the structure 106 and/or an angle of the structure 106). The access point 102 may use some or all of this information to determine the position 306 of the structure 106 in the system 100.

The access point 102 may transmit multiple signals 302 and receive and analyze multiple reflections 304 to determine the position 306 of the structure 106. The multiple signals 302 may be transmitted in multiple different directions to sweep an area. The access point 102 then uses the reflections 304 from these signals 302 to determine the position 306 of the structure 106.

The access point 102 then sets a guard interval 308 based on the position 306 of the structure 106 in the system 100. The access point 102 may determine, from the position 306, the propagation delays, echoes, and reflections that may be caused by the structure 106. These propagation delays, echoes, and reflections may cause interference at a reception point for a signal or message transmitted by the access point 102. By setting the guard interval 308, the access point 102 introduces a time interval between transmissions of signals or messages, which reduces the interference caused by the propagation delays, echoes, and reflections. The access point 102 may set the guard interval 308 to be a sufficient time period to mitigate or reduce the interference resulting from the propagation, delays, echoes, and reflections caused by the position 306 of the structure 106.

The access point 102 then transmits a message 310 according to the guard interval 308. For example, the guard interval 308 may specify a time interval between successful transmissions of messages 310. The access point 102 may transmit a message 310 and then wait for the time interval indicated by the guard interval 308 before transmitting another message 310. In this manner, the access point 102 reduces or mitigates the interference caused by the position 306 of the structure 106 in the system 100.

In some embodiments, the access point 102 combines other techniques (e.g., high accuracy distance measurement with Bluetooth low energy) to characterize channels between the access point 102 and devices 104. The access point 102 may use these techniques to determine information in addition to the information in the reflection 304. The access point 102 may adjust certain parameters (e.g., WiFi rate selection) using this information.

Figure 4:
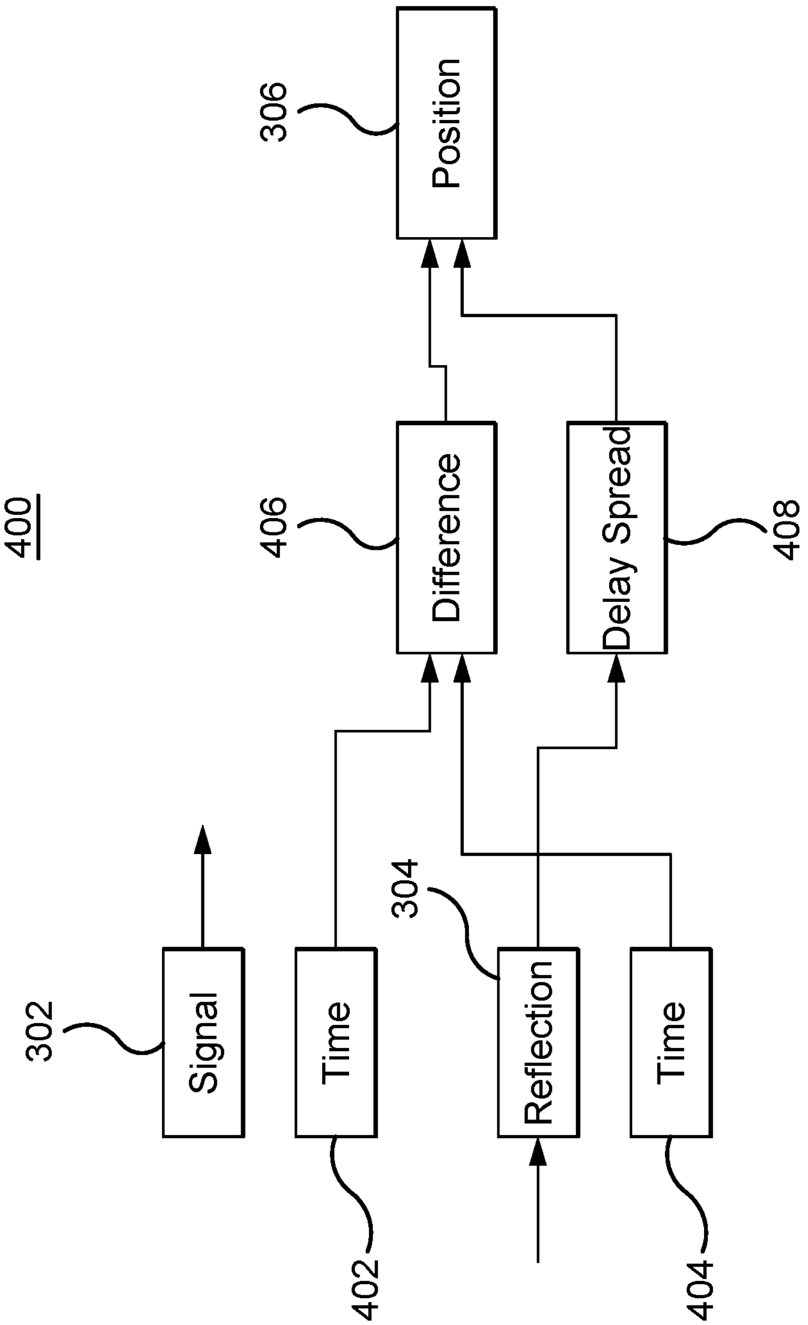
FIG. 4 illustrates an example operation for determining position performed by the system of FIG. 1.

FIG. 4 illustrates an example operation 400 for determining the position 306 of a structure 106 performed by the system 100 of FIG. 1. The access point 102 performs the operation 400. By performing the operation 400, the access point 102 uses the reflection 304 to determine the position 306.

The access point 102 begins by transmitting the signal 302, which may be an impulse. The access point 102 may determine, track, or monitor a time 402 when the signal 302 was transmitted. The signal 302 may be reflected or redirected by the structure 106 in the system 100. The access point 102 receives the reflection 304, which is a reflected or redirected version of the signal 302. The reflection 304 may include distortions that were not present in the signal 302. For example, the reflection 304 may include frequencies or amplitudes that are different from the signal 302. The access point 102 determines, tracks, or monitors a time 404 when the reflection 304 was received.

The access point 102 determines a difference 406 between the time of 404 and the time of 402. As a result, the difference 406 indicates a time interval between the time 402 when the signal 302 was transmitted and the time 404 when the reflection 304 was received. The access point 102 may use this difference 406 to determine the position 306 of the structure 106 in the system 100. For example, the difference 406 may indicate a distance between the access point 102 and the structure 106. The access point 102 may also consider the directionality of the signal 302 and/or the reflection 304 to determine in which direction the structure 106 is positioned relative to the access point 102. Using this information, the access point 102 may determine the position 306 of the structure 106 in the system 100. In some embodiments, the position 306 is a relative position of the structure 106 with the access point 102 (e.g., how far and in which direction the structure 106 is from the access point 102). In certain embodiments, the access point 102 knows its own position in the system 100, and the access point 102 uses its own position to determine the position 306 of the structure 106 as an absolute position in the system 100.

In particular embodiments, the access point 102 determines a delay spread 408 in the reflection 304. The delay spread 408 may indicate a time interval between when components of the reflection 304 were received by the access point 102. For example, the structure 106 may redirect or reflect different components of the signal 302 in different directions. Many of the redirected or reflected components may travel longer distances before being received at the access point 102. As a result, different components or portions of the reflection 304 are received at different times at the access point 102. The delay spread 408 indicates the time interval between when the first portion of the reflection 304 was received and when the last portion of the reflection 304 was received. The access point 102 may use the delay spread 408 to further determine or hone the position 306 of the structure 106 in the system 100.

Figure 5:
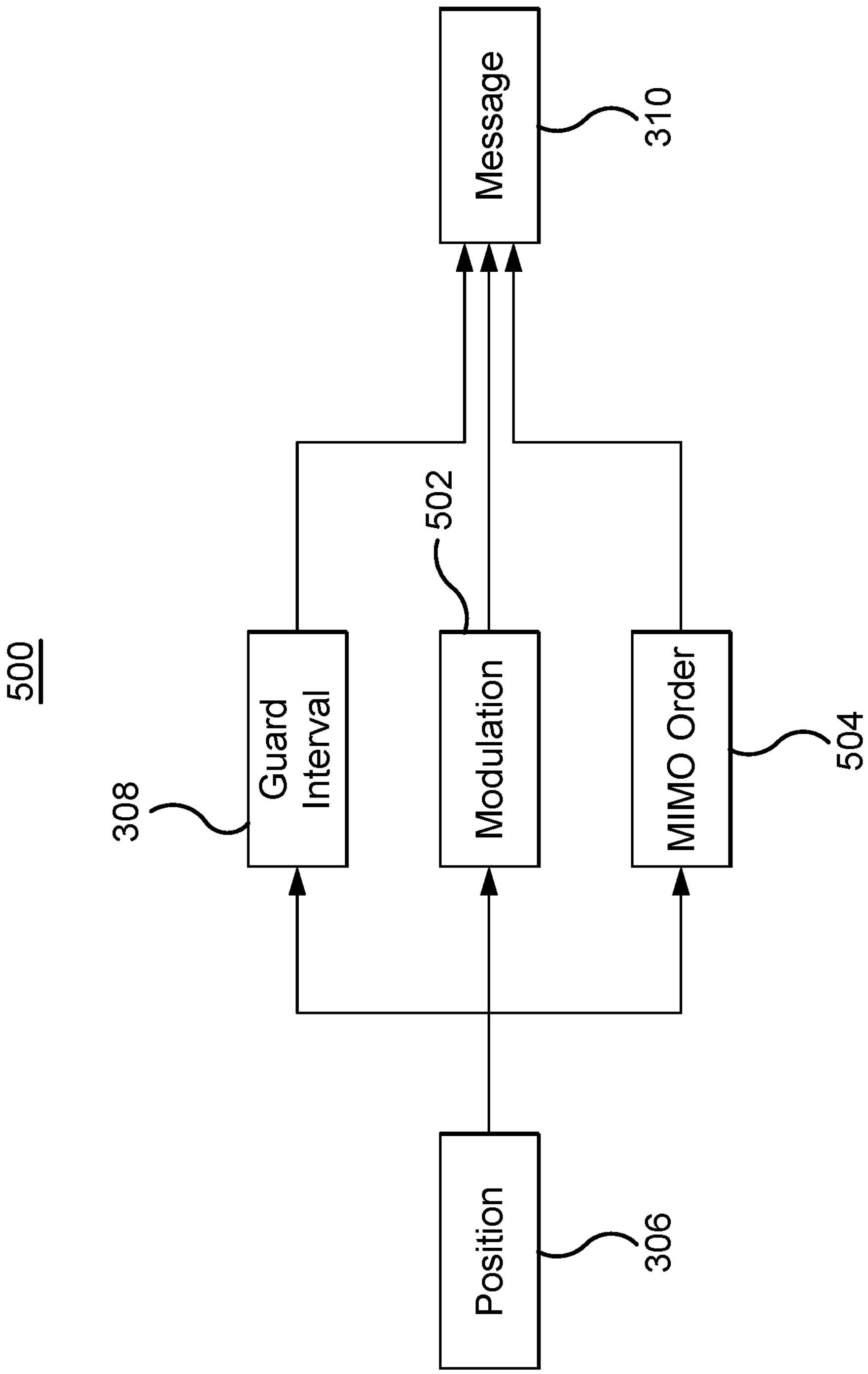
FIG. 5 illustrates an example operation for transmitting a message performed by the system of FIG. 1.

FIG. 5 illustrates an example operation 500 for transmitting a message 310 performed by the system 100 of FIG. 1. The access point 102 performs the operation 500. By performing the operation 500, the access point 102 sets various transmission properties using the position 306 of the structure 106 in the system 100.

The access point 102 determines the position 306 of the structure 106 as discussed using previous figures. The access point 102 sets the guard interval 308 using the determined position at 306 of the structure 106. The guard interval 308 may indicate a time interval between successive transmissions of messages 310. This time interval may mitigate or reduce the interference resulting from propagation delays, echoes, or reflections introduced by the structure 106. The access point 102 may wait for the time interval indicated in the guard interval 308 before transmitting a subsequent message 310 to reduce or mitigate the interference caused by propagation delays, echoes, or reflections.

The access point 102 may set other transmission characteristics using the position 306 of the structure 106. For example, the access point 102 may adjust a modulation 502 applied to the messages 310. By adjusting the modulation 502, the access point 102 may adjust a frequency or amplitude of a carrier signal used during modulation of the message 310. The access point 102 may then transmit the messages 310 according to the adjusted modulation 502. As another example, the access point 102 may adjust a multiple-input multiple-output (MIMO) order 504 for transmitting a message 310. The access point 102 may transmit different portions of the message 310 using different radios 206. By adjusting the MIMO order 504, the access point 102 adjusts the order in which the portions of the messages 310 are transmitted. The access point 102 may then transmit the messages 310 using the adjusted MIMO order 504. In this manner, the access point 102 may reduce or mitigate interference resulting from propagation delays, echoes, or reflections caused by the position 306 of the structure 106 in certain propagation paths for the portions of the message 310.

Figure 6:
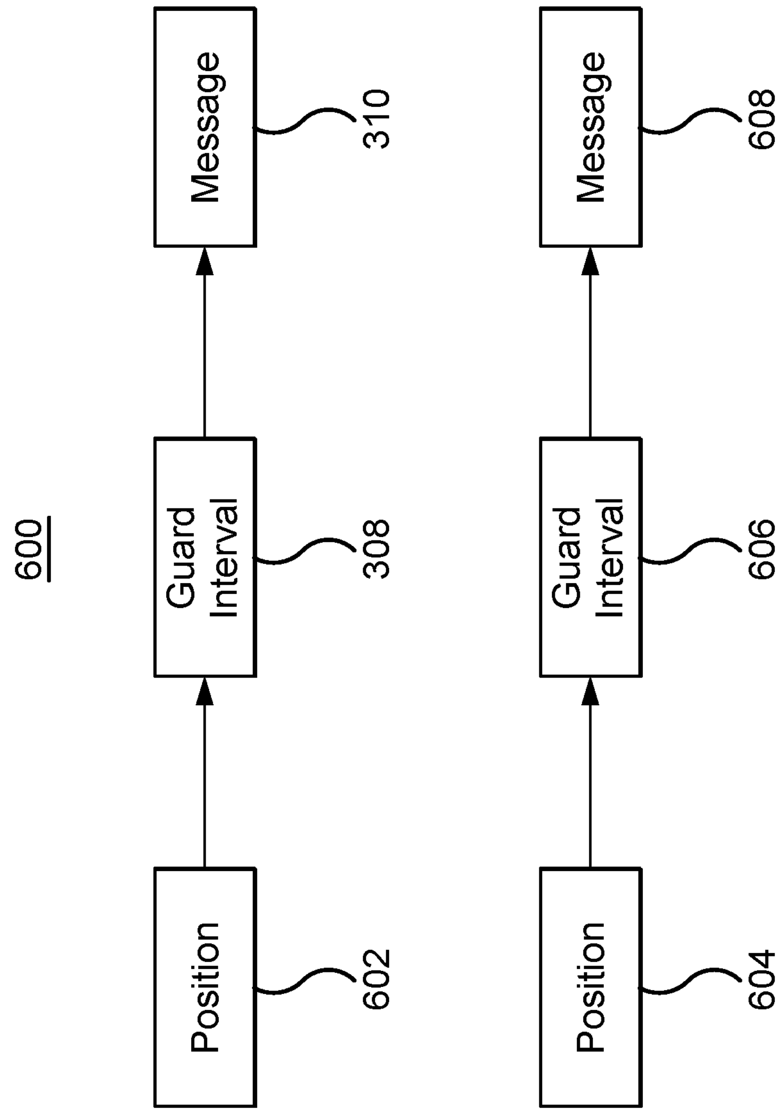
FIG. 6 illustrates an example operation for setting guard intervals performed by the system of FIG. 1.

FIG. 6 illustrates an example operation 600 for setting guard intervals performed by the system 100 of FIG. 1. The access point 102 performs the operation 600. By performing the operation 600, the access point 102 sets different guard intervals for different devices 104 in the system 100 based on their positioning with respect to the structure 106.

The access point 102 begins by determining a position 602 of a first device 104 in the system 100. The access point 102 may use any technique for determining the position 602 of the first device 104. For example, the access point 102 may use fine timing measurements between the access point 102 and the first device 104 to determine the position 602 of the first device 104. The access point 102 may transmit signals to the first device 104, and the first device 104 may transmit responses back to the access point 102. The access point 102 may measure the amount of time it takes for the message to reach the first device 104 and the amount of time it takes for the response from the first device 104 to reach the access point 102. The access point 102 then uses these times to determine the position 602 of the first device 104 in the system 100. As another example, the access point 102 may use geolocation reporting to determine the position 602 of the first device 104. The first device 104 may transmit to the access point 102 coordinates indicating the geolocation of the first device 104. The access point 102 may use these coordinates to determine the position 602 of the first device 104 in the system 100.

The access point 102 may determine, from the position 602, the relative positioning between the first device 104 and the structure 106 in the system 100. For example, the access point 102 may consider both the position 306 of the structure 106 and the position 602 of the first device 104 to determine the relative positioning of the first device 104 with respect to the structure 106. The relative positioning may indicate the interference at the first device 104 resulting from propagation delays, echoes, or reflections caused by the structure 106.

The access point 102 sets the guard interval 308 for the message 310 that the access point 102 transmits to the first device 104. The guard interval 308 may mitigate or reduce the interference caused by the position 306 of the structure 106. When setting the guard interval 308, the access point 102 may also consider the interference that would occur at the first device 104 based on the position 602 of the first device 104. As a result, the guard interval 308 is set to reduce or mitigate interference at the device 104 that may be caused by the structure 106.

The access point 102 determines a position 604 of a second device 104 in the system 100 (e.g., using fine timing measurements or geolocation reporting). The position 604 is different from the position 602. Additionally, the second device 104 may have a different relative position with respect to the structure 106. As a result, the interference experienced at the second device 104 may be different than at the first device 104.

The access point 102 sets a guard interval 606 for the second device 104. The access point 102 may consider the position 604 of the second device 104 and the position 306 of the structure 106 when setting the guard interval 606. For example, the access point 102 may determine, from the position 306 of the structure 106 and the position 604 of the second device 104, a certain level of interference at the second device 104 resulting from propagation, delays, echoes, or reflections caused by the structure 106. The guard interval 606 may be set to mitigate or reduce the interference at the second device 104. The guard interval 606 may be different from the guard interval 308, because the second device 104 may experience a different level of interference than the first device 104 due to the second device 104 being at a different position 604 than the first device 104.

The access point 102 transmits messages 608 to the second device 104 according to the guard interval 606 rather than the guard interval 308. Because the guard interval 606 is different from the guard interval 308, the access point 102 may wait for a different time interval when transmitting messages 608 to the second device 104 than when transmitting messages 310 to the first device 104. As a result, the guard interval 606 reduces or mitigates the interference experienced at the second device 104 resulting from propagation, delays, echoes, or reflections caused by the structure 106. In this manner, the access point 102 sets different guard intervals for different devices 104 based on the different positions of those devices 104 in the system 100.

Figure 7:
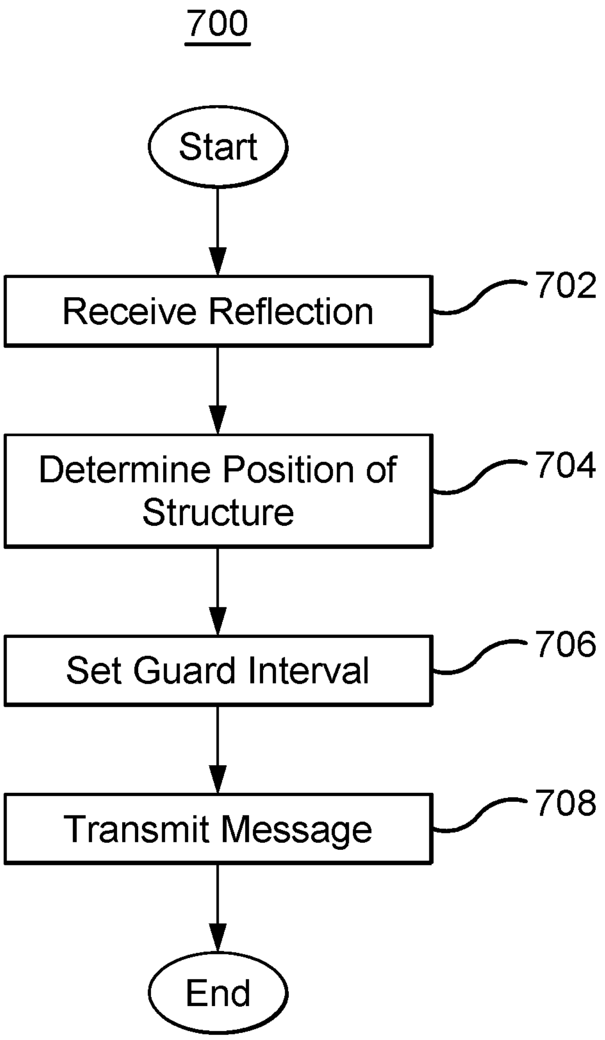
FIG. 7 is a flowchart of an example method for setting a guard interval performed in the system of FIG. 1.

FIG. 7 is a flowchart of an example method 700 for setting a guard interval 308 performed in the system 100 of FIG. 1. In particular embodiments, the access point 102 performs the method 700. By performing the method 700, the access point 102 determines the position 306 of the structure 106 in the system 100 and sets the guard interval 308 according to the position 306 of the structure 106.

In block 702, the access point 102 receives the reflection 304. The access point 102 transmits the signal 302, which may be an impulse. The signal 302 is redirected or reflected by the structure 106. The access point 102 receives the reflection 304, which may be the redirected or reflected version of the transmitted signal 302.

In block 704, the access point 102 determines the position 306 of the structure 106. For example, the access point 102 may determine a time 402 when the signal 302 was transmitted and a time 404 when the reflection 304 was received. The access point 102 may then determine the difference 406 between the times 402 and 404. The access point 102 determines the position 306 of the structure 106 according to the difference 406. For example, the difference 406 may indicate a distance between the access point 102 and the structure 106 in the system 100. Additionally, the directionality of the signal 302 and the reflection 304 may indicate in what direction the structure 106 is positioned relative to the access point 102. Using this information, the access point 102 determines the position 306 of the structure 106 in the system 100.

In some embodiments, the structure 106 reflects or redirects different components or portions of the signal 302 in different directions. As a result, different components or portions of the reflection 304 are received at the access point 102 at different times. The access point 102 determines the delay spread 408, which is the amount of time between when the access point 102 receives the first component or portion of the reflection 304 and when the access point 102 receives the last component or portion of the reflection 304. The access point 102 may use the delay spread 408 when determining or honing the position 306 of the structure 106.

In block 706, the access point 102 sets the guard interval 308 according to the position 306 of the structure 106. For example, the access point 102 may determine the propagation delays, echoes, or reflections that the structure 106 would introduce based on the position 306 of the structure 106. The access point 102 may also determine the interference that the propagation delay, echoes, or reflection would introduce at a reception point. The access point 102 then sets the guard interval 308 to mitigate or reduce this interference.

In block 708, the access point 102 transmits the message 310 according to the guard interval 308. The guard interval 308 may indicate a time interval that the access point 102 should wait between successive transmissions of messages 310. The access point 102 may transmit a message 310 and then wait for the time interval indicated in the guard interval 308 before transmitting another message 310. In this manner, the access point 102 reduces or mitigates the interference experienced at a reception point of the message 310 resulting from propagation delays, echoes, or reflections caused by the structure 106 in the system 100.

In summary, the access point 102 uses the principles of radiolocation (e.g., radar) to determine the positions of a structure 106 (e.g., wall, door, etc.) in the environment. The access point 102 may transmit a signal 302 (e.g., an impulse) that is reflected back to the access point 102 by the structure 106. The access point 102 determines, from the reflection 304, the position 306 of the structure 106 that reflected the signal 302. The access point 102 then sets a guard interval 308 to reduce interference caused by the structure 106. For example, the access point 102 may determine, from the position 306 of the structure 106, the reflections and interference that the structure 106 will cause. The access point 102 may then set the guard interval 308 that reduces this interference.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:

a first radio arranged to receive a reflection comprising a signal reflected by a structure;

one or more memories; and one or more processors communicatively coupled to the one or more memories, a combination of the one or more processors configured to:

determine, based on the reflection, a position of the structure;

determine a first position of a first device;

determine, based on the position of the structure and the first position of the first device, an interference caused by the structure to receptions at the first device;

set a first guard interval based on the interference; and transmit, to the first device, messages according to the first guard interval.

2. The apparatus of claim 1, further comprising a second radio arranged to transmit the signal.

3. The apparatus of claim 1, wherein the signal is an impulse.

4. The apparatus of claim 1, wherein determining the position of the structure comprises determining a difference between a time when the signal was transmitted and a time when the reflection was received.

5. The apparatus of claim 1, wherein the combination of the one or more processors is further configured to set a modulation based on the position of the structure, and wherein the messages are transmitted according to the modulation.

6. The apparatus of claim 1, wherein determining the position of the structure comprises determining a delay spread of the reflection.

7. The apparatus of claim 1, wherein the combination of the one or more processors is further configured to set a multiple-input and multiple-output order based on the position of the structure, and wherein the messages are transmitted according to the multiple-input and multiple-output order.

8. The apparatus of claim 1, wherein the combination of the one or more processors is further configured to:

determine a second position of a second device, wherein the second position is different from the first position;

set a second guard interval based on the position of the structure and the second position of the second device; and transmit messages to the second device according to the second guard interval.

9. A method comprising:

receiving, by a first radio, a reflection comprising a signal reflected by a structure;

determining, based on the reflection, a position of the structure;

determining a first position of a first device;

determining, based on the position of the structure and the first position of the first device, an interference caused by the structure to receptions at the first device;

setting a first guard interval based on the interference; and transmitting, to the first device, messages according to the first guard interval.

10. The method of claim 9, further comprising transmitting, by a second radio, transmit the signal.

11. The method of claim 9, wherein the signal is an impulse.

12. The method of claim 9, wherein determining the position of the structure comprises determining a difference between a time when the signal was transmitted and a time when the reflection was received.

13. The method of claim 9, further comprising setting a modulation based on the position of the structure, and wherein the messages are transmitted according to the modulation.

14. The method of claim 9, wherein determining the position of the structure comprises determining a delay spread of the reflection.

15. The method of claim 9, further comprising setting a multiple-input and multiple-output order based on the position of the structure, and wherein the messages are transmitted according to the multiple-input and multiple-output order.

16. The method of claim 9, further comprising:

determining a second position of a second device, wherein the second position is different from the first position;

setting a second guard interval based on the position of the structure and the position of the second device; and transmitting messages to the second device according to the second guard interval.

17. An access point comprising:

a first radio arranged to transmit an impulse;

a second radio arranged to receive a reflection comprising the impulse reflected by a structure;

a combination of one or more processors configured to:

determine, based on the reflection, a position of the structure;

determine a first position of a first device;

determine, based on the position of the structure and the first position of the first device, an interference caused by the structure to receptions at the first device;

set a first guard interval based on the interference; and transmit, to the first device, messages according to the first guard interval.

18. The access point of claim 17, wherein determining the position of the structure comprises determining a difference between a time when the impulse was transmitted and a time when the reflection was received.

19. The access point of claim 17, wherein the combination of one or more processors is further configured to set a modulation based on the position of the structure, and wherein the messages are transmitted according to the modulation.

20. The access point of claim 17, wherein the combination of one or more processors is further configured to:

determine a second position of a second device, wherein the second position is different from the first position;

set a second guard interval based on the position of the structure and the position of the second device; and transmit messages to the second device according to the second guard interval.

* * * * *